(12) United States Patent
Peng

(10) Patent No.: US 7,102,702 B2
(45) Date of Patent: Sep. 5, 2006

(54) LIQUID CRYSTAL PANEL CARRIER WITH PLURALITY OF CANNELURES INSIDE A BOX AND A PLURALITY OF SEPARATE ATTACHING ELEMENTS

(76) Inventor: Chih-Fang Peng, No. 133, Laujuang Rd., Yangmei Jen, Taoyuan (TW) 326

( * ) Notice: Subject to any disclaimer, the term of this patent is extended or adjusted under 35 U.S.C. 154(b) by 0 days.

(21) Appl. No.: 10/604,129

(22) Filed: Jun. 27, 2003

(65) Prior Publication Data
US 2004/0201791 A1    Oct. 14, 2004

(30) Foreign Application Priority Data
Apr. 11, 2003   (TW)  ................................ 92108335 A

(51) Int. Cl.
*G02F 1/1333* (2006.01)
*B65D 85/00* (2006.01)
*B65D 85/575* (2006.01)

(52) U.S. Cl. ........................... 349/58; 349/60; 206/711; 206/387.15

(58) Field of Classification Search ................. 349/58, 349/60; 206/454, 710, 711, 387.14, 387.15
See application file for complete search history.

(56) References Cited

U.S. PATENT DOCUMENTS

| | | | | |
|---|---|---|---|---|
| 5,873,468 A | * | 2/1999 | Ejima et al. | 206/711 |
| 5,950,836 A | * | 9/1999 | Iwamoto et al. | 206/711 |
| 6,098,808 A | * | 8/2000 | Matsuda et al. | 206/708 |

* cited by examiner

*Primary Examiner*—Tarifur R. Chowdhury
(74) *Attorney, Agent, or Firm*—Quintero Law Office

(57) ABSTRACT

A panel carrier comprising a box and a plurality of attaching elements is provided. The interior lateral surfaces of the box have a plurality of cannelures. The ends of each attaching element are inserted into the corresponding cannelures on the lateral surfaces of the box so that the interior of the box is partitioned into variable size compartments.

9 Claims, 3 Drawing Sheets

LIQUID CRYSTAL PANEL CARRIER WITH PLURALITY OF CANNELURES INSIDE A BOX AND A PLURALITY OF SEPARATE ATTACHING ELEMENTS

BACKGROUND OF THE INVENTION

1. Field of Invention

The present invention relates to a carrier for packaging panels. More particularly, the present invention relates to an adjustable panel carrier.

2. Description of Related Art

At present, panels are often packaged inside a carrier unit having an integrative design. In general, the panels are laid down flat inside a carrier or plugged into the specially designed slots of a carrier. Since the grooves for gripping each panel are normally fixed in dimension, a panel of one particular size can be accommodated inside the carrier. However, due to the rapid improvement in digital technologies, newer types of panel with a range of different dimensional designs are constantly developed. To accommodate newer versions of the panels, the carrier has to be redesigned and fabricated while the old ones have to be scrapped. This leads not only to a waste of material but also a waste of molding resources.

Furthermore, the material for fabricating an integrative carrier unit also has some important effects on protecting the panels being accommodated. If the carrier is fabricated using a harder material, the carrier can act as a rigid body to resist any deformation. On the contrary, if the carrier is fabricated using a softer material, the carrier can act as a buffer to absorb any shock or vibration. However, the conventional carrier can serve either as a rigid body resisting any deformation or a softer body resisting shock but not both. Furthermore, each carrier normally has a considerable number of interior slots rendering a proper cleaning difficult. If some chipped pieces happen to stick to the surface of a slot due to breakage of some panel, all panels subsequently lowered into the slot of the carrier may be scratched.

SUMMARY OF THE INVENTION

Accordingly, one object of the present invention is to provide a panel carrier having an adjustable interior partition to fit panel of various dimensions.

A second object of this invention is to provide a panel carrier that can minimize resource wastage.

A third object of this invention is to provide a panel carrier that buffers the panels against shock and protects the panel against damaging deformation.

A fourth object of this invention is to provide a panel carrier whose design prevents any loose chips from scratching the surface of the panels.

To achieve these and other advantages and in accordance with the purpose of the invention, as embodied and broadly described herein, the invention provides a first type of panel carrier. The panel carrier comprises a box and a plurality of attaching elements. The interior lateral surface of the box has a plurality of cannelures. The side edges at the respective ends of each attaching element are plugged into correspondingly positioned cannelures so that the interior of the box is partitioned into variable size compartments. The box is fabricated using a material harder than the attaching elements.

This invention also provides a second type of panel carrier. The panel carrier comprises a box and a plurality of attaching elements. The interior bottom surface of the box has a plurality of cannelures. The attaching elements are plugged into correspondingly positioned cannelures inside the box so that the interior of the box is partitioned into variable size compartments. The box is fabricated using a material harder than the attaching elements.

In this invention, the interior of the panel carrier is partitioned into compartments using movable attaching elements. Hence, the panel carrier can be refitted on demand to accommodate another panel having a larger or a smaller size simply by repositioning the interior attaching elements so that the size of each compartment is increased or decreased. In other words, the panel carrier can be used to package panels of whatever sizes.

Both the attaching elements and the box are replaceable. That means, a defective attaching element or box can be replaced individually so that material waste is maintained at the lowest level.

Furthermore, the attaching elements and the box can be manufactured using materials having a different density. For example, the external box structure is fabricated using a higher density material to prevent the attaching elements and the panels from being squashed or distorted due to an impact. Similarly, the attaching elements are fabricated using a lower density material to provide some flexibility for protecting the panels against shock and external impact.

In addition, the attaching elements can be taken out of the box. Thus, the box interior as well as the attaching elements can be thoroughly cleaned with ease.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
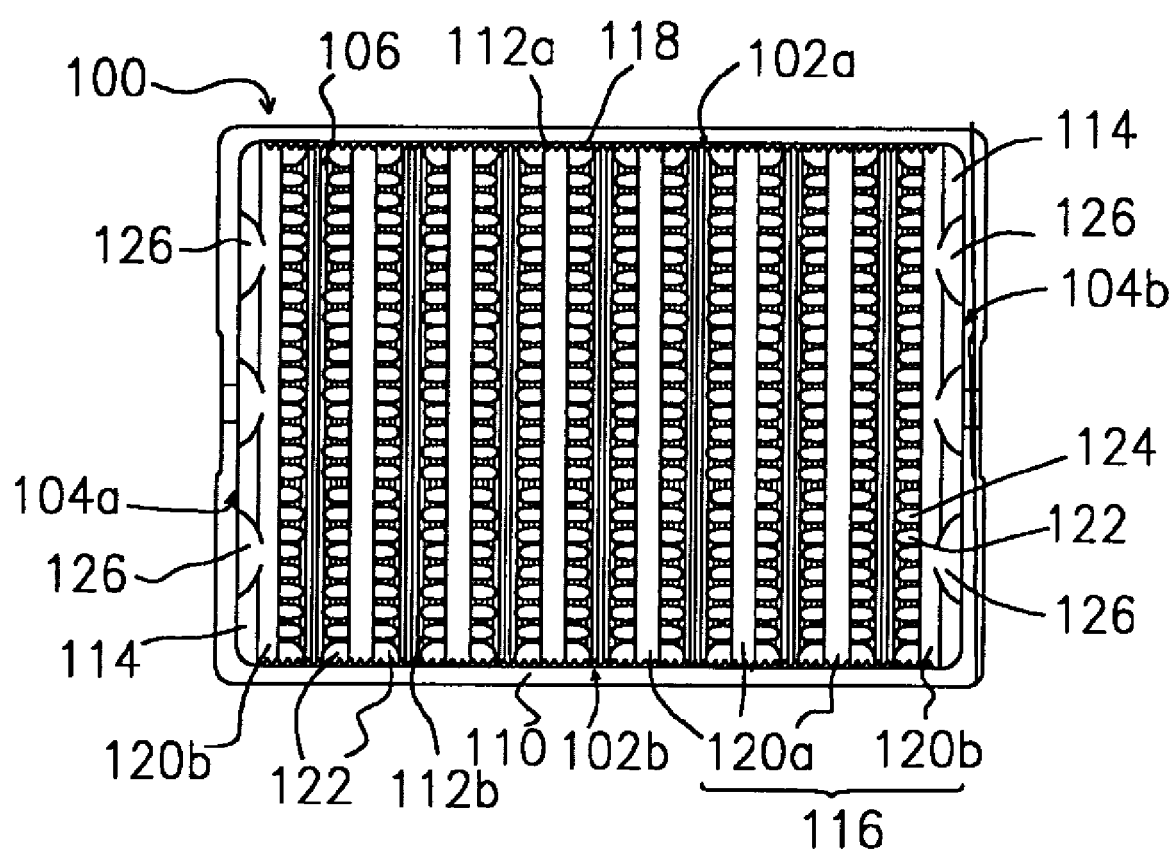
FIG. 1 is a top view showing a panel carrier assembly according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a top view showing a panel carrier assembly according to one preferred embodiment of this invention. As shown in FIG. 1, the panel carrier 100 comprises a box 100 and a plurality of attaching elements 116. The interior of the box 110 furthermore comprises a bottom surface 106 and pairs of oppositely positioned lateral surfaces 102a, 102b, 104a and 104b. The bottom surface 106 and all the lateral surfaces 102a, 102b, 104a, 104b have cannelures thereon including, for example, saw-tooth-like cannelures 112b on the bottom surface 106, saw-tooth-like cannelures 112a on the oppositely faced lateral surfaces 102a, 102b or dovetail grooves 114 on the oppositely faced lateral surfaces 104a, 104b. In addition, the positioning of the cannelures on the interior walls of the box 110 can be varied on demand. For example, cannelures may be formed on the lateral surfaces 102a, 102b, the lateral surfaces 104a, 104b or the bottom surface 106 only instead of on all the interior surfaces as shown in FIG. 1. Moreover, the box 110 may be fabricated using a material harder than the attaching elements 116 so that the panel carrier serves not only as a buffer but also a shield against panel deformation.

As shown in FIG. 1, the attaching element 116 has a plate-like structure with its edges plugged into corresponding cannelures inside the box 110 for partitioning the interior into variable size compartments. The edges of the attaching element 116 have a saw-tooth profile 118 that corresponds with the saw-tooth cannelures 112a, 112b so that the attaching element 116 can be firmly stationed inside the box 110. In other words, as long as the attaching elements 116 are firmly clamped inside the box 110, whether the bottom surface 106 or the lateral surfaces 102a, 102b or the lateral surfaces 104a, 104b have cannelures or not is not too important. Furthermore, the attaching elements 116 can be divided into two major types. One type of attaching element 120a has a plurality of edges 122 protruding from each of its lateral surfaces. Hence, the edges 122 of any two neighboring attaching elements 120a form a slot 124 for accommodating a panel. In another type of attaching element 120b, edges 122 protrude from one lateral surface while the other lateral surface has a plurality of clamping sections 126. The clamping sections 126 correspond in position to the dovetail grooves 114 for engaging the attaching element 120b and the box 110 together.

Figure 2:
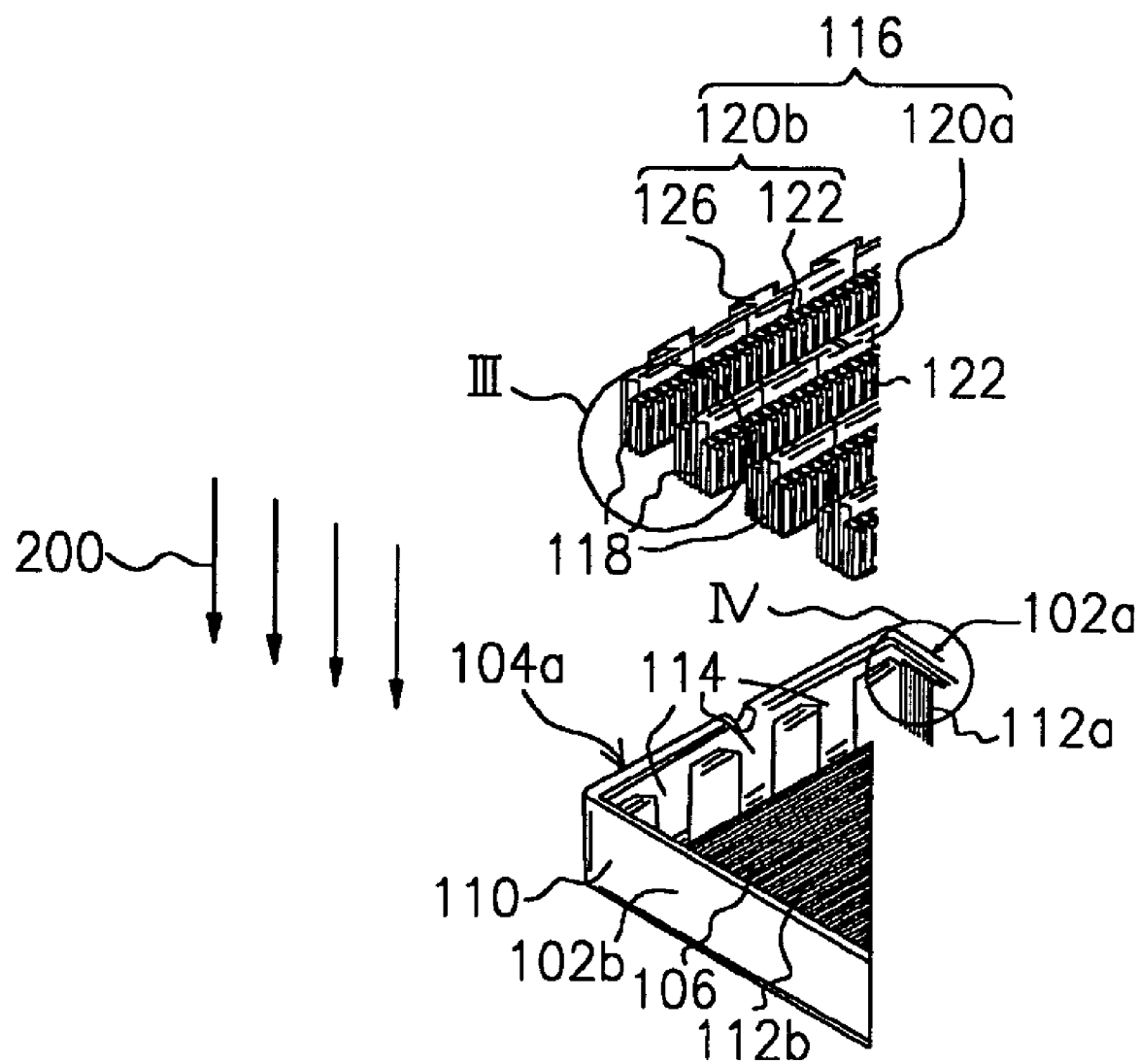
FIG. 2 is a perspective view showing various dismembered components in the panel carrier assembly shown in FIG. 1.

FIG. 2 is a perspective view showing various dismembered components in the panel carrier assembly shown in FIG. 1. After finding the size of the panel to be packaged inside the box 110, the dimension of each compartment for accommodating the panel and the number of attaching elements 116 for partitioning the interior into useful compartments can be determined. Thereafter, the attaching elements 120b are inserted into the lateral surface 104a of the box 110 in a direction 200. Ultimately, the dovetail grooves 114 engage with the clamping sections 126 and the saw-tooth cannelures 112a on the lateral surfaces 102a, 102b of the box 110 as well as the saw-tooth cannelures 112b at the bottom surface 106 of the box 110 engage with the saw-tooth cannelures 118 of the attaching element 120b. Afterwards, the attaching elements 120a are sequentially inserted into the interior of the box 110 according to the pre-determined partition dimension. In other words, the saw-tooth cannelures 118 at the edges of the attaching element 120a engages with the saw-tooth cannelures 112a on the lateral surfaces 102a, 102b and the saw-tooth cannelures 112b of the bottom surface 106. To explain the structural relation between the box 110 and the attaching elements 116, refer to the magnified views in FIGS. 3 and 4.

Figure 3:
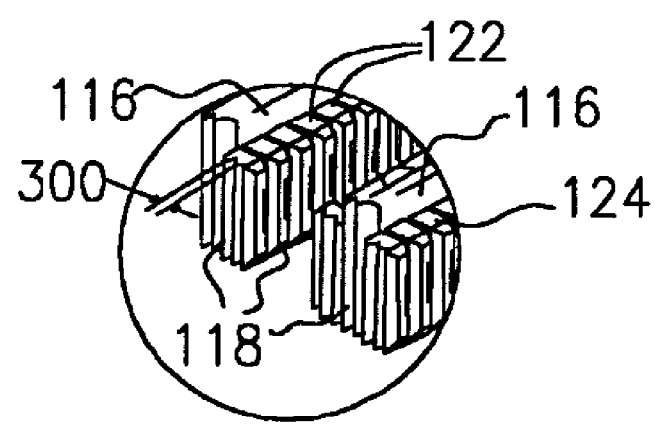
FIG. 3 is a magnified view of section III in FIG. 2.

FIG. 3 is a magnified view of section III in FIG. 2. As shown in FIG. 3, the two ends and the bottom section of each attaching element 116 has saw-tooth cannelures 118. Furthermore, the lateral surface of the attaching element 116 has protruding edges 122 so that the protruding edges 122 of any two neighboring attaching elements 116 form a slot 124 for accommodating a panel. The pitch 300 of the teeth in the saw-tooth cannelures 118 is about 5 mm, for example. Since the saw-tooth cannelures 118 are set on the edges of the attaching elements 116, the saw-tooth cannelures 118 can also be set on the surface of the protruding edges 122 at each end of the attaching element 116 as well as the bottom surface of the protruding edges 122.

Figure 4:
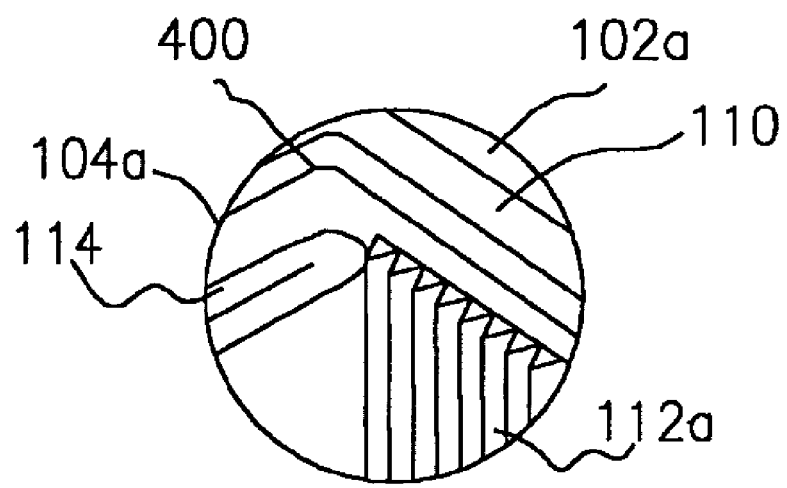
FIG. 4 is a magnified view of section IV in FIG. 2.

FIG. 4 is a magnified view of section IV in FIG. 2. According to the embodiment, saw-tooth-like cannelures 112a are set on the lateral surface 102a of the box 110 and dovetail grooves 114 are set on another lateral surface 104a of the box 110. The connecting section 400 between the lateral surface 102a and the lateral surface 104a is also shown in FIG. 4. With the dovetail grooves 114 serving as a cannelure imprint, the side with the saw-tooth cannelures 112a separates from the connecting section 400 of the lateral surfaces 102a and 104a by a distance.

In summary, major characteristics of this invention include:

1. Attaching elements that can be relocated are used inside the panel carrier so that panels of various sizes can be accommodated. Hence, one type of carrier can be used to package all sorts of panels.

2. Since the attaching elements inside each panel carrier are replaceable, any damaged attaching element or box can be individually replaced to save material.

3. Unlike a conventional integrative panel carrier, the box can be fabricated using a material harder than the attaching elements so that the panels inside the box are protected against shock and vibration and at the same time the box is prevented from impact deformation.

4. Because the attaching elements can be taken out of the carrier, cleaning the interior of the box is relatively easy.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

The invention claimed is:

1. A panel carrier at least comprising:
 a box, wherein interior lateral surfaces of the box have a plurality of cannelures; and
 a plurality of separate attaching elements, each attaching element comprising a plate and two opposing ends, wherein the two opposing ends of each attaching element are independently receivable into any of the corresponding cannelures on the two opposing interior lateral surfaces to partition the interior of the box into a plurality of compartments of various sizes, and at least one side of the plate comprises a plurality of protruding edges such that any pair of the neighboring protruding edges of adjacently disposed attaching elements constitutes a slot for accommodating a panel.

2. The panel carrier of claim 1, wherein one side of the plate of at least one attaching element has a plurality of clamping sections for engaging with the corresponding cannelures of the interior surfaces of the box.

3. The panel carrier of claim 2, wherein the clamping section comprises a crow-footed base.

4. The panel carrier of claim 1, wherein the box is fabricated using a material harder than the attaching elements.

5. The panel carrier of claim 1, wherein the box further comprises a plurality of bottom cannelures corresponding to the cannelures on the two opposing interior lateral surfaces, and each attaching element further comprises a bottom end receivable in the bottom cannelure corresponding to the cannelures on the two opposing interior lateral surfaces in which the attaching element is received.

6. The panel carrier of claim 1, wherein the cannelures have a saw-tooth-like profile.

7. The panel carrier of claim 3, wherein each attaching element has a saw-tooth-like profile that matches the saw-tooth-like cannelures on the interior surface of the box.

8. The panel carrier of claim 1, wherein the interior lateral surfaces of the box furthermore comprises a plurality of dovetail grooves.

9. The panel carrier of claim 1, wherein both sides of the plate of at least one attaching elements have a plurality of protruding edges.

* * * * *